Aug. 7, 1923.
A. WEAVER
FRUIT PICKER
Filed Oct. 4, 1920
1,463,859
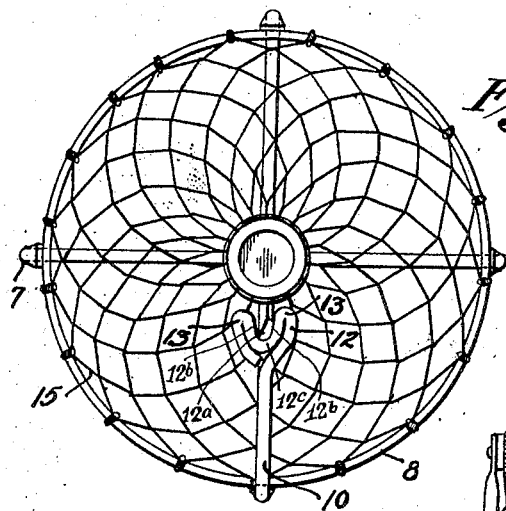
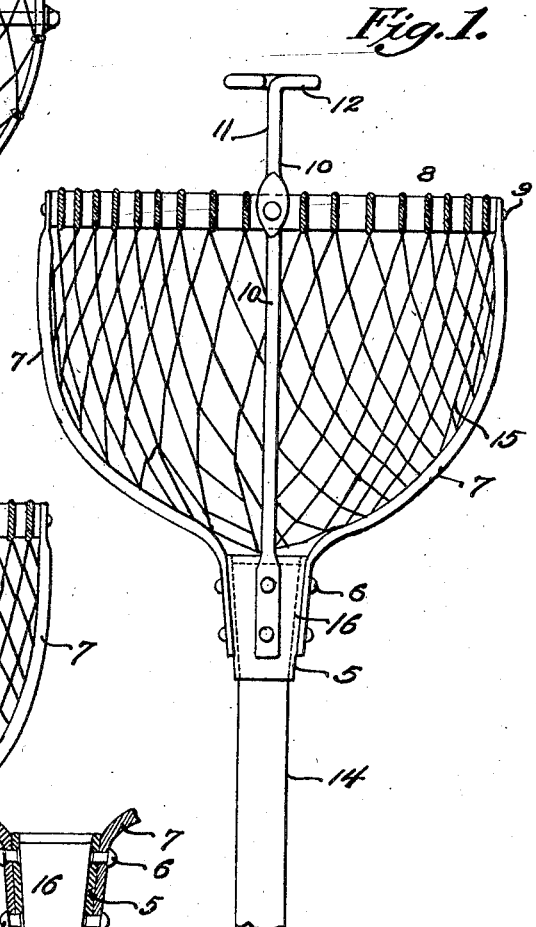
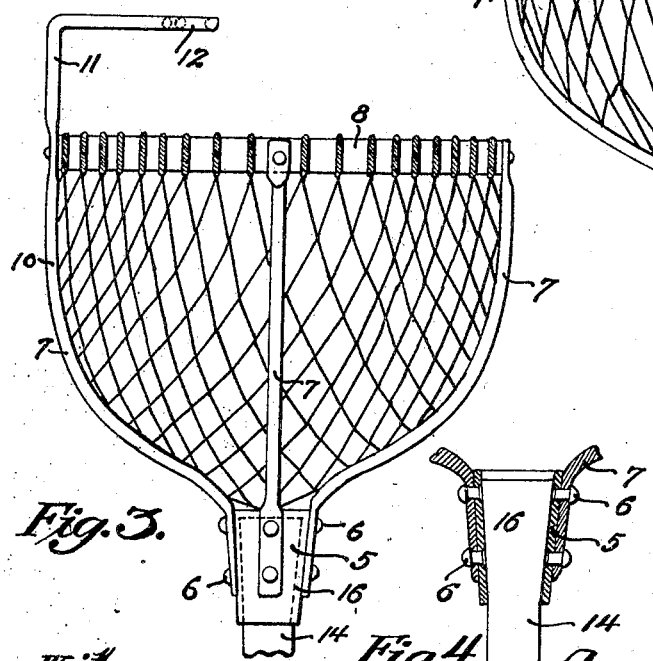
Witnesses
Edward F. Wendig
Augustus B. Coppes
Inventor
Amandus Weaver,
By Joshua R. H. Potts
his Attorney Patented Aug. 7, 1923.

1,463,859

UNITED STATES PATENT OFFICE.

AMANDUS WEAVER, OF PHILADELPHIA, PENNSYLVANIA.

FRUIT PICKER.

Application filed October 4, 1920. Serial No. 414,451.

*To all whom it may concern:*

Be it known that I, AMANDUS WEAVER, a citizen of the United States, residing at Philadelphia, in the county of Philadelphia and State of Pennsylvania, have invented certain new and useful Improvements in Fruit Pickers, of which the following is a specification.

One object of my invention is to provide an improved fruit picker of the pole type which can be readily used to pick the fruit from the branches of trees which are too high to permit the fruit to be picked directly by hand.

Another object is to so construct my improved fruit picker that it will include means for directly engaging the fruit at points at either side of the stem and cause the fruit to drop without injury in a basket which forms a part of my invention.

A still further object is to provide means whereby a constant pulling of the device will not loosen it from its handle or pole.

A still further object is to make my invention of a comparatively simple construction so that it can be quickly and easily made and sold at a comparatively low cost.

These objects, and other advantageous ends which will be described hereinafter, I attain in the following manner, reference being had to the accompanying drawings in which—

Figure 1 is a front elevation of a fruit picker made in accordance with my invention; a part of the pole being broken away, Figure 2 is a top plan view of Figure 1, Figure 3 is a side elevation of my improved picker, and Figure 4 is a fragmentary view, partly in section, showing how the handle or pole is attached.

Referring to the drawing, 5 represents a frusto-conical sleeve which tapers downwardly and which is preferably made of metal. To this sleeve is attached, preferably by rivets 6, a number of braces 7 which are bowed outwardly from the sleeve 5 and at their upper ends are attached to a ring 8; said braces are made of round wire which is flattened at portions to provide ready means of connection by rivets 9 at their tops to the ring 8 and at their bottoms by said rivets 6 to the sleeve 5. One of the braces, which is specifically indicated by the reference numeral 10, has a continued portion 11 which extends above the ring 8 and this portion at its top is bent toward the axis of the ring and the end part of the portion 11 is bent in a number of convolutions in the same plane to provide a fork 12, the prongs 13 of which serve to provide a recess $12^a$ having side walls $12^b$ smoothly merging into an inner curved wall $12^c$. The prongs 13 serve to engage around the stem of the fruit so that by pulling downwardly on the pole 14, the fruit will be detached from the branch of a tree and will fall within a basket or receptacle 15 positioned within the confines of the braces 7. That is, one of the outwardly and upwardly extending braces 7 or arms 7, or the strand composing the same, is bent upon itself at spaced points, with the bent portions substantially in contact, and having an intermediate arcuate portion with the concaved side forward. It will be noted that the fork 12 is formed by a continuous bending of the extended wire portion 11 and therefore presents smooth rounded parts to the fruit so that the fruit will not be scratched or bruised even though it is necessary at times to pull the same at a slant.

The basket 15 is preferably made of wire mesh screen in which the meshes are produced by twisting wires together and the upper edge of the screen is secured in position by bending the ends of the wire around the ring 8. The pole 14 at its end 16 flares upwardly as clearly shown in Figure 4 and fits within the sleeve 5; the bottom portion of the basket preferably having a hole therein sufficiently large to permit the pole to be inserted through the top of the basket then downwardly through the sleeve 5 until the flared end 16 seats itself within the frusto-conical sleeve 5. Thus no amount of pulling of the pole will detach it from the upper portion of the device.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what

I claim as new and desire to secure by Letters Patent is:—

1. A fruit picker including a receptacle open at its top and having a series of braces extending outwardly and upwardly on its outer side, one of the braces having a portion extending over the open top and terminating in a fork, the fork being produced at the end of a single strand of a brace bent upon itself at spaced points with the bent portions arranged in contact forming a pair of prongs of double material and having an intermediate arcuate portion with the concaved portion forward terminating short of the center of the receptacle and radially in line therewith.

2. A fruit picker including a sleeve; a series of spaced braces extending outwardly and upwardly from the sleeve and each comprising a single strand; a ring supported at the upper ends of the braces; a basket mounted on the ring and extending within the braces and supported by the braces, the ring and the sleeve; a post with a flared upper end fitting in said sleeve; and a horizontally inwardly extending member disposed over the basket having a pair of prongs at its inner end providing a concave portion between said prongs.

3. A fruit picker including a sleeve tapering downwardly to provide a corresponding socket; a pole having its upper end flared and fitting the sleeve; a plurality of spaced pairs of braces having their lower extremities secured to a plurality of points externally on said sleeve and extending outwardly and upwardly; a ring secured to the brace at their upper extremities and within the same; and a basket supported by the ring, the braces and the top of the sleeve, one of the braces being extended above the ring, radially inward over the basket and formed with a horizontal fork at its inner end having double prongs with a concaved space therebetween.

In testimony whereof I have signed my name to this specification in the presence of two subscribing witnesses.

AMANDUS WEAVER.

Witnesses:
ELIZABETH GARBE,
CHAS. E. POTTS.